No. 672,661. Patented Apr. 23, 1901.
E. D. WOODS.
POLISHING MACHINE.
(Application filed Apr. 4, 1898.)
(No Model.) 2 Sheets—Sheet 1.
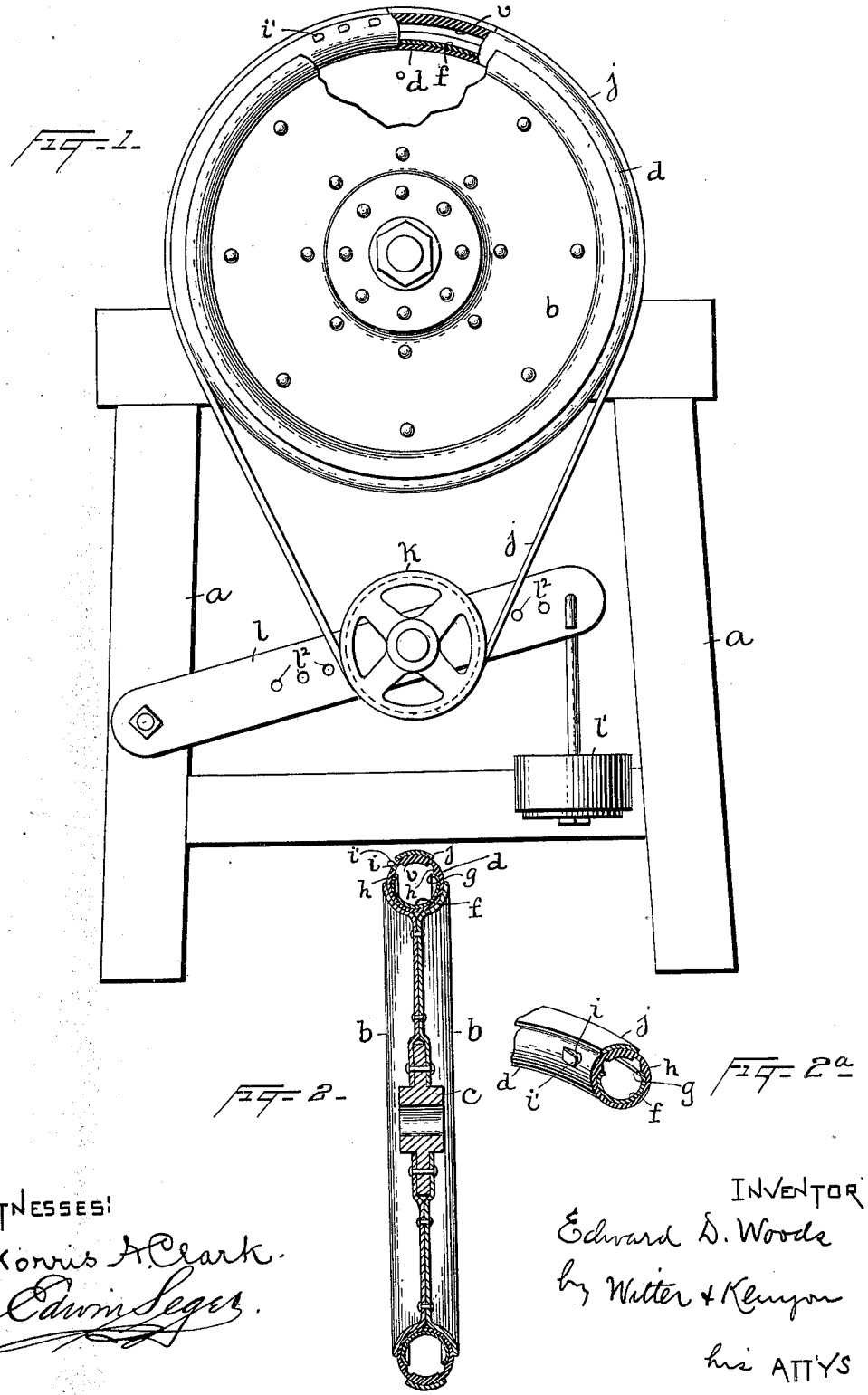
WITNESSES:
Norris A. Clark.
Edwin Seger.
INVENTOR
Edward D. Woods
by Witter & Kenyon
his ATT'YS No. 672,661. Patented Apr. 23, 1901.
E. D. WOODS.
POLISHING MACHINE.
(Application filed Apr. 4, 1898.)
(No Model.) 2 Sheets—Sheet 2.
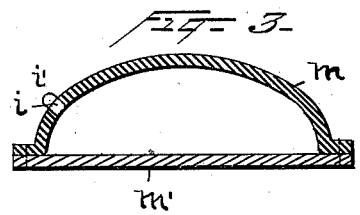
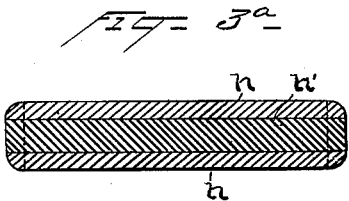
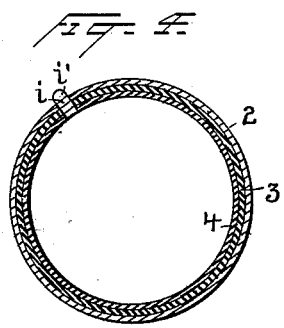
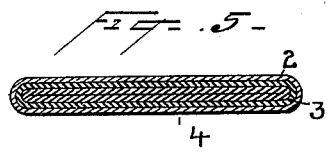
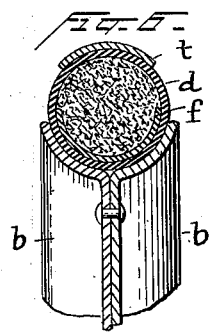
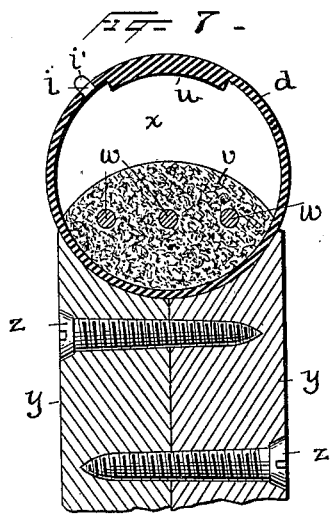
WITNESSES:
Norris A. Clark
Edwin Seyes
INVENTOR
Edward D. Woods
by Walter & Kenyon
his ATT'YS

UNITED STATES PATENT OFFICE.

EDWARD D. WOODS, OF GRANVILLE, NEW YORK, ASSIGNOR TO THE WOODS SPECIALTY COMPANY, OF NEW YORK.

POLISHING-MACHINE.

SPECIFICATION forming part of Letters Patent No. 672,661, dated April 23, 1901.

Application filed April 4, 1898. Serial No. 676,331. (No model.)

*To all whom it may concern:*

Be it known that I, EDWARD D. WOODS, a citizen of the United States, and a resident of Granville, in the county of Washington and State of New York, have invented certain new and useful Improvements in Polishing-Machines, of which the following is a specification.

My invention relates to machines and belts for polishing articles of manufacture, such as cutlery and any other thing that can be polished, buffed, or otherwise finished by contact with a rapidly-moving surface. Its object is to enable a pneumatic or cushioned tire to be used in such a machine without running any danger of the tire collapsing laterally, either partially or wholly, or of the tire leaving the surface of the wheel upon which it rests when the wheel is rotated rapidly; also, to provide improved means for inflating pneumatic tires in such machines and for easily regulating the air-pressure therein; also, to provide improved belts for such machines, and also means for adjustably tightening such belts.

It consists of the devices hereinafter described, and claimed in the claims at the end of this specification.

Heretofore pneumatic tires have been used upon polishing-wheels alone or in connection with a belt run thereon. Great difficulty has, however, been encountered in the use of such wheels for polishing purposes, owing to the fact that when such wheels are rotated with the great rapidity necessary for polishing purposes the pneumatic tires tend to separate from the wheel and also tend to collapse more or less laterally. This latter is a very serious objection in using such wheels for polishing cutlery and similar articles, as the speed there required is necessarily very great and as the polishing-surface of the tire is narrowed by such rapid rotation to such an extent as almost to destroy its usefulness for such polishing purposes. By means of my improved stiffening device, to be hereinafter described, I have entirely overcome both of these difficulties, the tire of my improved wheel being securely held upon the web of the wheel without any possibility of separating therefrom and the walls of the tire being held apart, so that they cannot collapse laterally, the tire thus furnishing a broad polishing-surface at all times.

Heretofore means for inflating pneumatic tires of polishing-wheels have necessitated the stoppage of the wheel for the purposes of inflation or deflation, thus consuming considerable time and involving considerable trouble. I have devised an improved means of inflating pneumatic tires or rims of polishing-wheels which is automatic and by means of which the air-pressure can be increased or diminished to vary the rigidity or softness of the rim or tire while the wheel is rotating and without any trouble and without loss of time.

In the drawings accompanying this specification, in which similar reference characters in the different figures represent corresponding parts, I have shown the preferred form of my invention, which I will now proceed to describe.

Figure 1 is a side elevation of a machine embodying my invention, parts being shown as broken out the better to illustrate the structure. Fig. 2 is a vertical sectional view through the center of the wheel shown in Fig. 1. Fig. 2ª is a perspective view of a portion of the tire. Fig. 3 is a cross-sectional view of one form of my improved belt. Fig. 3ª is a cross-sectional view of another form of polishing-belt. Fig. 4 is a cross-sectional view of another form of belt open, and Fig. 5 is a like view with the belt flattened. Fig. 6 is a cross-sectional view of my improved wheel-rim, showing the body of the latter made of sponge-rubber and a strip of felt or other suitable substance cemented to the tread of the wheel. Fig. 7 is a cross-sectional view of a modified form of my improved tire and a modified form of the web portion of the wheel.

In the machine shown in Figs. 1 and 2, *a* designates the frame of the machine, which may be of any suitable form or size. This frame supports a rotary wheel *b* in suitable bearings. The wheel *b* comprises in its construction a hub *c* and a web consisting, preferably, of two sheets of metal riveted together and having their circular edges flared outwardly and curved, so as to form between them a substantially semicircular groove to receive and hold therein a circular cushion rim or tire $d$. Where the cushion-tire $d$ consists of a hollow air-tube, it is necessary that it should be made capable of adjustment to any degree of rigidity, since if left without such means the extent of its usefulness would be greatly curtailed, if, indeed, it could be successfully used at all in polishing articles.

In Figs. 1, 2, 2$^a$, 3, 4, and 7 the cushion-tire $d$ is not made air-tight. These figures show my improved means for adjusting the amount of air-pressure in such tires, and hence of regulating the rigidity or softness of the tire. These means consist of one or more openings $i$, each provided with a flap $i'$ in one side of the tire, through which the air can enter into the interior of the tire. The opening and flap may be made in any suitable way; but I prefer to make them by partially cutting out a portion of the wall of the tire in the form shown in flap $i'$ or in any desirable form, leaving the flap at one end connected to the tire, as shown. The free end of the flap should of course lie in the direction toward which the wheel is to rotate, so that as the wheel rotates the flap will open and force air into the tire. I have found that with such an opening or openings more air will enter the tire the faster the wheel is rotated, and thus the more rapid the rotation of the wheel the more rigid becomes the surface of the tire. In this way without stopping the wheel and by simply rotating the wheel faster or more slowly the tire can be made of any rigidity or softness desired and the wheel be thus easily adapted for polishing different and varying surfaces.

My improved cushion-tire instead of being made hollow and being inflated, as above described, may be filled with sponge-rubber, as shown in Fig. 6, or a cushion effect may be given to it in any well-known manner—as, for example, in the well-known air-tight and inflatable pneumatic tire.

To prevent the cushion-tire from separating from the wheel during rapid rotation or from collapsing laterally at such time, I place within the rim or tire $d$ and in the lower part of the interior thereof a stiffening device. I have shown in Figs. 1, 2, 2$^a$, and 6 as my preferred form of stiffening device a circular hoop $f$, preferably made of steel or similar material, substantially semicircular in cross-section. This hoop fits into the bottom of the tube $d$, extends up along its sides, and is preferably curved inward at its upper edges $g$, as shown in Figs. 2 and 2$^a$. This hoop $f$ serves the purpose of holding the rim or tire on the wheel against being thrown off from centrifugal tendency or action, prevents the tire from collapsing laterally from the same action, and maintains the rim or tire in proper place or position at all times. In the preferred form of the hoop $f$ the edges are curled inward, as shown in Fig. 2, in order that a better form of surface may be presented to the article being finished when it is placed upon the wheel and borne upon by the article to be finished than though the edges of the hoop terminated abruptly, as though half-round in form in cross-section. Again, by curving the edges of the hoop inward at the top they are less likely to hold upon the rim or tire $d$ and to cut the same. To further avoid this last-mention result, I reinforce the tire on the inside, as at $h$, opposite the edges $g$. This reinforcement affords a bearing means for the edges of the hoop which enhances the polishing effects of the wheel, as well as improving its durability. In Fig. 7 I have shown a modification of the stiffening device and of the form of the web of the wheel. In this form the stiffening device consists of a ring $v$, of hard rubber or similar material, in which is embedded wires $w$. The ring and wires produce a similar effect to that of the hoop $f$, holding the tire $d$ upon the wheel and preventing lateral collapsing of the walls of the tire. In this form also, $u$ is a reinforcement on the inner side of the upper part of the tire. The web of the wheel is composed of two parts $y$ $y$, secured together by screws $z$ $z$. The part $x$ represents the air space or chamber above the ring $v$. As shown in Fig. 7, this air-chamber $x$ is inflated or deflated through opening $i$.

The tire of the wheel may itself be sanded or provided with an emery surface, so that the machine as thus far described may be employed as a complete polishing or finishing machine, and, as before stated, the tire can be inflated to any degree of rigidity that will suit any work in hand. The adjustment of the rigidity of the tire is, as before stated, very important, since from experience I have found that with some articles the best results are obtained with a softer and more readily yielding surface or body, while with other articles the harder or more rigid surface is required.

Instead of making the cushion-tire hollow and inflating it, as stated, I may form the body of the cushion-tire of sponge-rubber, as shown in Fig. 6. In this case the hoop $f$ is cast into the body of the tire and the necessity of curving inward the upper edges of the hoop is not as great.

In most cases it is proposed to employ a belt $j$, arranged to run about the wheel over the tire just described. This belt runs, preferably, about the tightening-pulley $k$, running on a stud connected with a pivoted lever $l$, as shown in Fig. 1. This lever carries at one end a weight $l'$, hooked to the lever $l$ through holes $l^2$. The weight causes the pulley to exert a tightening pressure upon the belt $j$. I have arranged a number of holes $l^2$ at varying distances from the pivot of the lever, so that by moving the weight $l'$ from one hole to another the pressure exerted by the pulley on the belt may be increased or diminished. The belt may be covered with emery or be sanded and may be variously constructed. Of the belts which I have found efficient for the purpose I have illustrated three forms in the drawings. That shown in Fig. 3 consists of a belt curved or half-round in form upon one side and flat upon the other. It has an outer shell of rubber or leather $m$ and a straight edge portion $m'$, the two parts encircling an air receptacle or chamber, having, preferably, an opening $i$, provided with a flap $i'$, as shown. This air-chamber may be air-tight and be inflated with air by any suitable means, or it may be constructed with an opening $i$ into the atmosphere, as shown, or it may be filled with sponge-rubber, felt, or other cushioning substance. In use, the flat part $m'$ of this belt may be run upon the wheel, since it would readily accommodate itself to the contour of the latter, while the rounded portion in connection with the tire will afford a better form of surface for polishing and finishing articles.

In Fig. 3ª I have shown the belt or wheel cover as made substantially flat, the upper and lower parts $n\,n$ being composed of leather, rubber, or other material, and the central part $n'$ of felt, rubber, sponge-rubber, hair, or other cushioning material to obviate the rigidity of a hard wheel-rim. The parts $m$ and $m'$ are secured together by sewing, riveting, cementing, or otherwise.

In Figs. 4 and 5 I have shown a belt made originally in the form of a tube, the outer layer 2 being of rubber or leather, the intermediate layer 3 of leather, and the inner layer 4 of rubber. This tube is flattened to form it into a belt, as shown in Fig. 5, and may be placed and run upon a wheel and tightening-pulley, as shown in Fig. 1.

In Fig. 6 I have shown a strip $t$ of leather or other suitable material as cemented to the tire in order that emery or other sanding material may be cemented thereon. This band $t$ may be employed on the structure shown in Figs. 1 and 2 in lieu of the belt.

It is necessary to my improved wheel that when the tire is used the latter should be yielding and quite sensitive to pressure and also that it should be adjustable as to rigidity, so as to adapt it to meet different requirements in the operation of polishing or finishing metal articles.

The belts shown may be employed upon a wheel as a completely-constructed belt would be used, or they may be employed as tires to the wheel or as wheel-covers.

What I claim as new, and desire to secure by Letters Patent, is—

1. In a polishing-machine, a wheel having a cushion rim or tire provided in the lower part of its interior with a stiffening-hoop, substantially half-round in cross-section, and a polishing-strip of suitable material cemented to the rim or tire, substantially as set forth.

2. In a polishing-machine, the combination with a rotary wheel having a hollow rim or tire, of an opening provided with a flap for the admission of air, whereby the pressure of air in the rim or tire may be varied by varying the speed of rotation of the wheel, substantially as set forth.

In testimony whereof I have signed my name to this specification in the presence of two subscribing witnesses.

EDWARD D. WOODS.

Witnesses:
H. T. SEYMOUR,
C. B. PATTERSON.